US011263781B2

(12) United States Patent
Lemdani et al.

(10) Patent No.: US 11,263,781 B2
(45) Date of Patent: Mar. 1, 2022

(54) PROCESS FOR DETERMINING THE INFILTRATION OF BIOLOGICAL CELLS IN A BIOLOGICAL OBJECT OF INTEREST

(71) Applicants: Centre National de la Recherche Scientifique (CNRS), Paris (FR); Universite Paris Descartes, Paris (FR); Ecole Nationale Superieure de Chimie de Paris, Paris (FR); Assistance Publique-Hopitaux de Paris, Paris (FR); Universite De Versailles-St Quentin En Yvelines, Versailles (FR); Institut National de la Sante et de la Recherche Medicale (INSERM), Paris (FR)

(72) Inventors: Kathia Lemdani, Paris (FR); Johanne Seguin, Kremlin Bicêtre (FR); Armand Tiede Djiro, Saint-Maur-des-Fosses (FR); Jean-Francois Emile, Paris (FR); Camille Kurtz, Paris (FR); Nicolas Lomenie, Paris (FR)

(73) Assignees: Centre National de la Recherche Scientifique (CNRS); Universite Paris Descartes; Ecole Nationale Supérieure de Chimie de Paris; Assistance Publique-Hopitaux de Paris; Universite De Versailles-St Quentin En Yvelines; Institut National de la Sante et de la Recherche Medicale (INSERM)

( * ) Notice: Subject to any disclaimer, the term of this patent is extended or adjusted under 35 U.S.C. 154(b) by 131 days.

(21) Appl. No.: 16/431,237

(22) Filed: Jun. 4, 2019

(65) Prior Publication Data

US 2019/0392612 A1 Dec. 26, 2019

(30) Foreign Application Priority Data

Jun. 21, 2018 (FR) ...................................... 1855513

(51) Int. Cl.
*G06T 7/90* (2017.01)
*G06K 9/00* (2006.01)

(52) U.S. Cl.
CPC ............ *G06T 7/90* (2017.01); *G06K 9/00147* (2013.01); *G06T 2207/10056* (2013.01); *G06T 2207/30024* (2013.01)

(58) Field of Classification Search
CPC ............ G06T 7/90; G06T 2207/10056; G06T 2207/30024; G06K 9/00147
See application file for complete search history.

(56) References Cited

U.S. PATENT DOCUMENTS

2013/0164762 A1 6/2013 Emile et al.
2020/0380672 A1* 12/2020 Clark .................... G06N 20/10

FOREIGN PATENT DOCUMENTS

WO 2012032173 A1 3/2012

OTHER PUBLICATIONS

Allard et al., Linear quantification of lymphoid infiltration of the tumor margin: a reproducible method, developed with colorectal cancer tissues, for assessing a highly variable prognostic factor, 2012, Diagnostic Pathology. (Year: 2012).*

(Continued)

*Primary Examiner* — Wednel Cadeau
(74) *Attorney, Agent, or Firm* — Lerner, David, Littenberg, Krumholz & Mentlik, LLP

(57) ABSTRACT

The invention relates to a process for determining an infiltration profile of biological cells of interest in a biological object of interest from a digital histopathological image of biological tissues, a histological stain having previously been applied to the biological tissues,
comprising generating a biological cell detection image, pixels associated with the histological stain on the histopathological image being of a predetermined color on said image,
determining a distance map comprising distance iso-curves to the boundary of the biological object,
and, from the distance map, calculating a curve representative of the surface density of biological cells of interest as a function of distance to the boundary, by counting, for each boundary distance value, pixels that are both of the predetermined color on the detection image and located (Continued)

between the iso-curve associated with said distance value and the consecutive iso-curve.

15 Claims, 8 Drawing Sheets

(56) References Cited

OTHER PUBLICATIONS

Allard, et al., "Linear quantification of lymphoid infiltration of the tumor margin: a reproducible method, developed with colorectal cancer tissues, for assessing a highly variable prognostic factor," Diagnostic Pathology, Dec. 2012, pp. 1-11, vol. 7, No. 1.

Djiro, et al. "Assessment of Anti-tumor Immune Response in Colorectal Carcinomas from Whole Slide Images," Proc. Int. Conf. Adv. Biometrics (ICB); [Lecture Notes in Computer Science; Lect. Notes Computer], Jun. 6, 2018, pp. 579-588, Springer, Berlin, Heidelberg.

Emile, et al., "Histiocytoses: General classification and molecular criteria," La Presse Médicale, Jan. 2017, pp. 46-54. vol. 46, No. 1.

French Preliminary Search Report for Application No. FR1855513 dated Mar. 28, 2019, 1 page.

Ruifrok, et al., "Quantification of histochemical staining by color deconvolution," Analytical and Quantitative Cytology and Histology, Aug. 1, 2001, pp. 291-299 vol. 23, No. 4.

\* cited by examiner

PROCESS FOR DETERMINING THE INFILTRATION OF BIOLOGICAL CELLS IN A BIOLOGICAL OBJECT OF INTEREST

CROSS-REFERENCE TO RELATED APPLICATIONS

The present application claims priority from French Application No. 1855513 filed Jun. 21, 2018, the disclosure of which is hereby incorporated herein by reference.

TECHNICAL FIELD OF THE INVENTION AND STATE OF THE ART

The invention belongs to the technical field of computer processing of biological images, preferably for applications in anatomic pathology.

The malignancy of a tumor, for example cancer, can be diagnosed, and/or the efficacy of a treatment can be assessed, by analyzing microscopic images of a tumor sample. The sample collected is cut into sections, and these sections are stained to reveal certain types of biological cells. Microscopic images of the sections, including stained biological cells, can be used by an anatomic pathologist to establish the malignancy of the tumor, assess the patient's prognosis for survival, evaluate the efficacy of a treatment, etc.

In particular, post-treatment immune cell infiltration into the tumor, such as lymphocyte infiltration, is a parameter of interest. It is established that a high density of tumor-infiltrating immune cells can be correlated with a strong anti-tumor immune response and therefore with a good prognosis for patient survival.

A well-known solution is to take a sample of biological tissue to be studied by punch biopsy and then make thin sections of the sample to obtain histological preparations. A health practitioner can then microscopically analyze the histological preparations and make a histopathological diagnosis. However, this solution requires that the practitioner have physical possession of the sample, which must therefore be transported and handled. In addition, the observation made by the practitioner is very difficult to repeat and reproduce.

Processes have been proposed for analyzing the infiltration density of immune cells from non-physical samples. For example, the international patent application WO 2012/032173 A1 describes a method for processing a virtual slide of tumor, comprising a quantification of cell density in a plurality of small areas. Said quantification areas are placed so as to overlap the tumor boundary. The virtual slide of tumor optionally comprises treatment with stains, including those specific to immune cells. That document describes a preferred embodiment wherein each of the quantification areas is a narrow rectangle, whose lengthwise perpendicular bisector is superimposed on the normal to the tumor front (see for example FIG. 7). The quantification of cell density within an area is carried out by counting the cells in slices of predefined width of the quantification rectangle, at different distances from the tumor front. After possibly calculating an average cell infiltration density over several quantification rectangles, a curve representative of cell density as a function of distance to the tumor front is obtained. This curve can be compared with typical cellular infiltration profiles. However, the process in that document does not produce a global measure that characterizes immune cell infiltration over the entire tumor. A complete analysis of the lesion is therefore not possible. The measure only provides a general trend of immune cell infiltration.

In addition, known software implementing that process is not adaptable to various tumor types and sizes, the quantification rectangle size being predetermined, or to various types of stains (including immunohistochemical stains). This solution is notably difficult to use during the preclinical study phase of the efficacy of a cancer treatment in non-human populations, prior to clinical trials.

GENERAL PRESENTATION OF THE INVENTION

There is therefore a need for a process to obtain an infiltration profile of a selected type of biological cells (for example a lymphocyte infiltration profile) in a biological object of interest, regardless of the type and size of the biological object.

In particular, there is a need for a process that provides, in a reliable and rapid manner, a global measure of biological cell infiltration at the scale of the entire biological object. One challenge is to obtain a repeatable and reproducible measure, producing objective results to assist the practitioner in making decisions, without replacing the practitioner.

There is an additional need for a process that could be used both in preclinical studies, on samples taken from animals, and in the clinical phase for human patients.

In addition, preferentially, a process is being sought that produces satisfactory results for different types of histological stains, and for different colors of stains.

The present invention meets this need by providing, according to a first aspect, a process for determining an infiltration profile of biological cells of interest in a biological object of interest, based on a digital histopathological image of biological tissues, a boundary of the biological object having previously been determined in the histopathological image, wherein a histological stain has previously been applied to the biological tissues, the process, carried out by a processing unit, comprising the following steps:
generating a biological cell detection image comprising pixels of a predetermined color, said pixels corresponding to the areas of the histopathological image stained with the histological stain,
determining a distance map comprising iso-curves, each iso-curve comprising all pixels of the region of interest located at a Euclidean distance to the boundary equal to a distance value;
from the distance map, calculating a curve representative of the surface density of biological cells of interest, the calculation comprising a count, for each boundary distance value, of pixels that are both of the predetermined color on the detection image and located between the iso-curve associated with said distance value and the consecutive iso-curve.

An advantage of the process of the invention is to provide a global measure of biological cell infiltration into the biological object. Separating the pixels of the histopathological image corresponding to the stain, combined with determining a distance map at the scale of the biological object, makes it possible to obtain a surface density curve of biological cells of interest at the scale of the entire biological object. The measure is reliable and reproducible.

An additional advantage is that the results obtained by this process do not depend on the size or type of the biological object studied.

Another advantage is that this process can be implemented automatically and quickly by a processing unit. An additional advantage is that surface density artifacts such as holes, folds and necrosis are corrected during implementation of the process, which makes the curve more robust.

Optional and non-limiting features of a process of the invention are the following, considered alone or in any one of their technically possible combinations:

during the calculation step, the surface density of biological cells of interest is obtained by the following formula:

$$f(d) = \frac{\alpha * \delta}{\beta * \theta},$$

where α is the number of pixels that are both of the predetermined color on the detection image and located between the iso-curve associated with the distance value d and the consecutive iso-curve, β is the total number of pixels between the iso-curve associated with the distance value d and the consecutive iso-curve, θ is a predetermined average number of pixels per biological cell, and δ is a predetermined number of pixels per unit area;

the step of generating the biological cell detection image comprises the following sub-steps:

from the histopathological image, separating the histological stain from other stains by image processing to give an intermediate image;

Otsu binarization of the intermediate image, detection of biological cells of interest from the intermediate image and from an image resulting from Otsu binarization, by separating a first class formed of pixels corresponding to the histological stain from a second class formed of the other pixels;

the histopathological image comprises, in addition to the histological stain, a non-specific stain, for example hematoxylin or eosin;

the step of separating the histological stain comprises a deconvolution of the colors of the histopathological image over the hue/saturation/lightness space;

the histological stain is diaminobenzidine or hematoxylin-aminoethylcarbazole;

the step of detecting biological cells of interest comprises a K-means classification using a centroid of the class of biological cells of interest and a centroid of the fibrosis class, the centroid of the class of biological cells of interest can then, preferentially, be taken equal to the minimum gray level of the intermediate image, and the equation for the centroid of the fibrosis class can be preferentially the following:

$$\alpha = \frac{\sum_{p \in \mathbb{N}^2} I(p) \mid I'(p) = 0}{|\{p \in \mathbb{N}^2 \mid I'(p) = 0\}|},$$

the process comprises a preliminary step of determining, manually or automatically, the boundary within the histopathological image;

the histopathological image is a virtual slide constituted by tiling a plurality of microscopic images of biological tissues;

in the distance map, pixels of the image outside the boundary are associated with a negative distance, and pixels of the image inside the boundary are associated with a positive distance, the surface density curve of biological cells of interest comprising negative distances on a left part and positive distances on a right part;

the process comprises an additional step of graphical representation of an infiltration map of cells of interest on which the iso-curves are superimposed on the histopathological image of the region of interest, the color of an area between two consecutive iso-curves being variable as a function of the surface density value of biological cells of interest;

the process comprises additional steps of determining an area under the surface density curve) of biological cells of interest as a function of distance to the boundary, for a given distance interval, and comparing the area obtained with a predetermined threshold value;

the biological object of interest is a tumor or a set of tumors, and the boundary is a tumor boundary;

the histopathological image, on which the boundary has previously been determined, is downloaded by the processing unit from a remote database, preferably via a network connection and even more preferably via an Internet connection;

the biological cells of interest are, for example, T cells, or B cells, or NK cells.

The present invention relates, according to a second aspect, to a processing unit comprising: a memory configured to record a histopathological image, a first subunit configured to determine a distance map comprising iso-curves, each iso-curve being associated with a distance value and comprising all pixels of the image located at a Euclidean distance from a boundary equal to said distance value, a second subunit configured to calculate a curve representative of the surface density of biological cells of interest in the image as a function of distance from the boundary, the processing unit being configured to implement the process as defined above.

Finally, the invention relates to a computer program product comprising code instructions which, when implemented by a processing unit, allow the execution of a process as defined above.

GENERAL PRESENTATION OF THE FIGURES

Other features, aims and advantages of the invention will emerge from the following description, which is purely illustrative and non-limiting, accompanied by the annexed drawings, among which:

FIG. 4b is a grayscale image resulting from the separation of the DAB stain in the image in FIG. 4a;

FIG. 4c is a grayscale image resulting from the separation of the hematoxylin stain in the image in FIG. 4a;

DETAILED DESCRIPTION

A process for determining the infiltration profile and an associated system are described below, for the particular case where the biological objects are tumors, for example cancerous tumors. The boundary of the biological object is therefore a tumor boundary in the following examples. It will be understood, however, that the invention can be used with the same advantages for the study of biological cell infiltration into biological objects other than tumors. For example, the following process can be applied to determine measures of infiltration of immune cells (such as lymphocytes) into a gland in the human or animal body, or into an organ transplanted into a patient, to determine whether there is rejection of the transplanted organ.

Hereinbelow, "histopathological image" means an image allowing a microscopic study of biological tissues, which can be used in histopathology in particular to monitor a disease. The biological tissues visible on such an image are most often biopsies or tissues collected during surgery. The methods for preparing a sample to obtain a histopathological image of satisfactory quality are well-known to the skilled person and will not be described below. For example, one histopathological image or a plurality of histopathological images can used to diagnose a human or animal patient, or to evaluate the efficacy of treatment given to said patient. The histopathological images described below comprise at least part of a tumor boundary, meaning an identifiable line of demarcation on the histopathological image between tumor tissue and non-tumor tissue. However, in some cases, isolated tumor cells may be present beyond the tumor front, particularly if there is a "tumor budding" phenomenon.

System for Determining a Biological Cell Infiltration Profile

Figure 1:
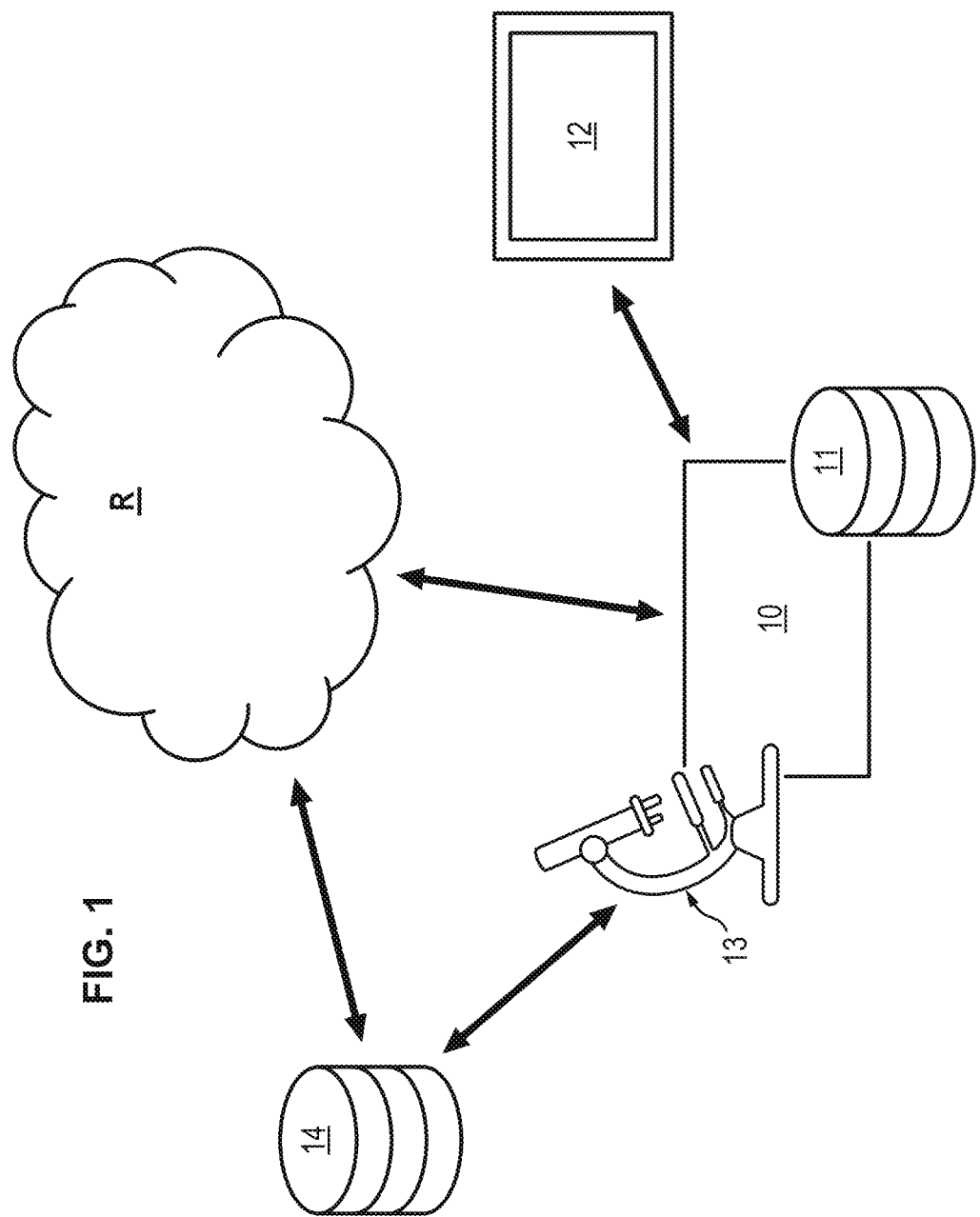
FIG. 1 is a schematic representation of a system for implementing a process for determining an infiltration profile of biological cells of interest.

FIG. 1 represents a system allowing, once a sample of biological tissue comprising a biological object of interest such as a tumor has been collected, the implementation of the lymphocyte infiltration profile determination process which will be described below.

The system comprises a processing unit 10 comprising calculation means, preferentially a processor. The processing unit 10 may also comprise a user interface to allow instructions to be entered by a user. The processing unit 10 comprises a memory 11 configured to store histopathological images, optionally annotated to indicate a tumor boundary, and to store lymphocyte infiltration profiles determined using the process to be described below. The memory 11 can optionally also be configured to save the intermediate images generated during the execution of the process. The processing unit is advantageously connected wired or wirelessly to a display 12 comprising a graphical interface. The screen 12 is notably configured to display histopathological images.

In a possible variant, the system comprises a histopathological image acquisition unit 13, configured to generate histopathological images from real biological tissues, the histopathological images being preferably stored in the form of virtual slides. "Virtual slide" refers to an image of biological tissues recomposed from several microscopic images, for example microscopic images at several different resolutions, for example by tiling. The virtual slides can notably be whole-slide images (WSI) images comprising very high-resolution views of tissue biopsies.

Preferably, the histopathological image acquisition unit 13 is a whole slide scanner. Alternatively, the unit 13 may be an optical microscope equipped with a camera.

Alternatively or in combination, the system comprises a remote database 14 from a remote server, the database 14 being configured to store in memory histopathological images, preferably virtual slides. The database 14 is capable of communicating with the processing unit 10 via a communication network N, preferably an Internet network, the processing unit 10 being configured in this variant to download histopathological images via the network N.

Preferably, virtual slides of individuals' biological tissues are shared on the secure network N, preferentially with secure access to data. The practitioner can thus, using known image processing software, obtain a view at a higher or lower resolution of different areas of a region of interest comprising a biological object to be studied. Such virtual slides and methods for their acquisition and sharing are well-known to the skilled person. The virtual slide consists of a plurality of slices of a tumor sample, deposited on slides and treated with histological stains. According to a preferred embodiment, the virtual slide consists of a single slice.

The use of virtual slides is very advantageous, since these slides can very easily be shared and annotated on known image processing software, remotely and without the need to handle a physical sample of the biological tissues to be analyzed.

In addition, such a virtual slide has the advantage over a biological sample of not degrading over time.

Finally, it is easier for a user to utilize a virtual slide of a biological object rather than a plurality of different views of the same biological object separated from each other.

Process for Determining a Profile of Lymphocyte Infiltration in a Tumor

Figure 2:
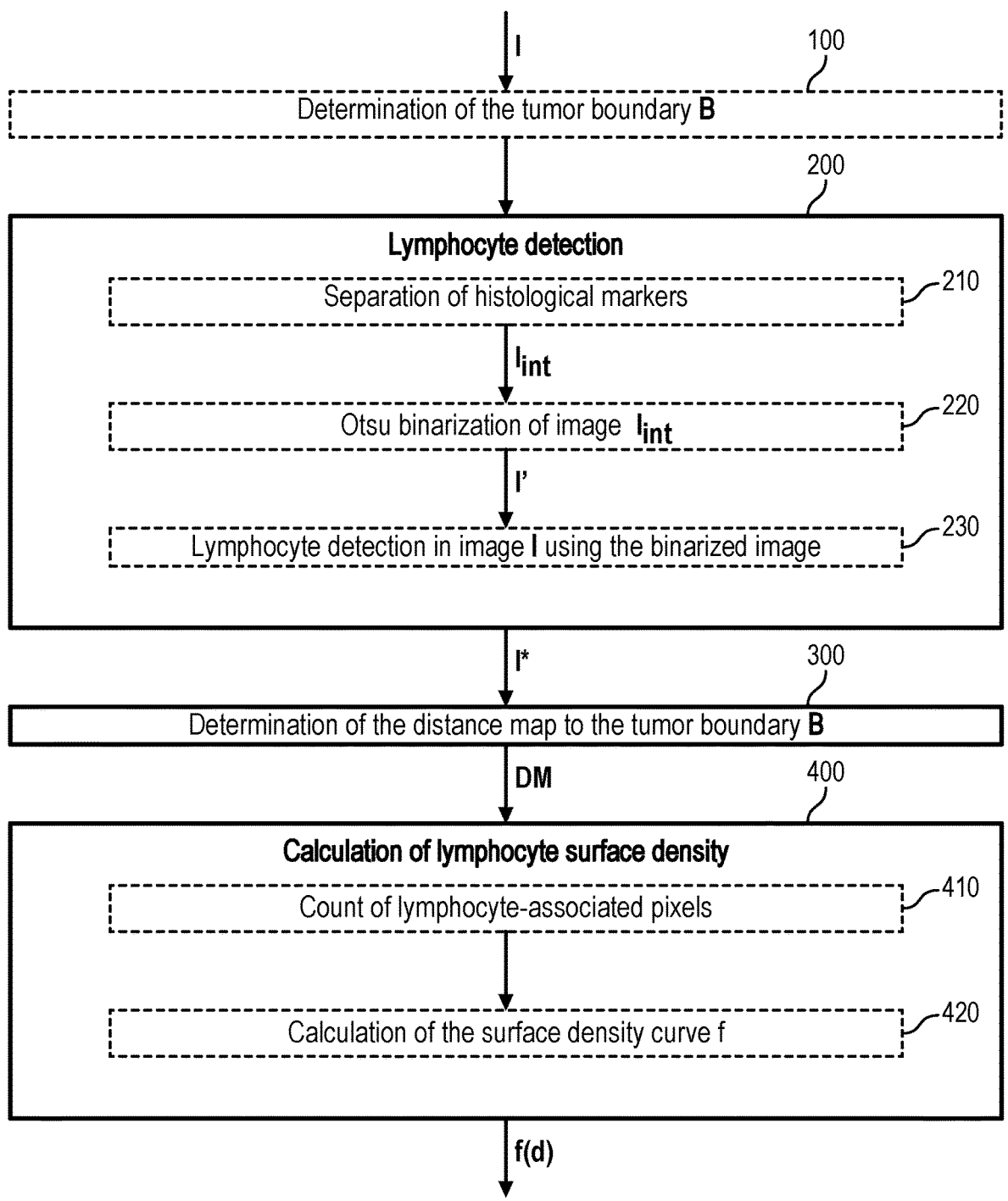
FIG. 2 shows the steps of a process according to one embodiment of the invention, in which the biological object studied is a tumor.

FIG. 2 represents the steps of a process of the invention according to a particular embodiment, wherein the biological object to be studied is a cancerous tumor, the boundary of said object is a tumor boundary (or tumor front) and the biological cells of interest whose infiltration is to be quantified are lymphocytes such as T cells or B cells.

It should be noted that the process in FIG. 2 can be applied with the same advantages to quantify the infiltration of other types of biological cells, notably NK cells, macrophages, dendritic cells.

For purely illustrative purposes, the process in FIG. 2 can be used to evaluate, in a preclinical study of a colorectal cancer (CRC) treatment, the response of a tumor to radiofrequency treatment followed by an injection of a granulocyte/macrophage colony-stimulating factor (GM-SF) gel whose role is to activate the dendritic cells responsible for the activation of the immune response. The purpose of such treatment is to destroy tumor cells that may recur after radiofrequency and to limit the appearance of other tumor cells at a distance from the treatment site. The tumor under study may be a primary tumor or a secondary metastasis.

The process in FIG. 2 makes it possible to obtain a profile of lymphocyte infiltration in the tumor, meaning a lymphocyte density quantification curve as a function of distance to the tumor front. This process can in particular be carried out by the processing unit 10 of the system represented schematically in FIG. 1.

The process in FIG. 2 takes as input a histopathological image I or a plurality of histopathological images of a tumor, preferably a virtual slide of tumor.

The tumor has previously been stained with at least one type of histological stain. The term "histological stain" refers to a chemical stain used in histology, allowing biological tissue to be stained. Non-specific stains which stain all cells of biological tissues in the same way, such as hematoxylin, which stains nuclear DNA blue-violet, or eosin, which stains cytoplasmic proteins pink, are distinguished from specific stains, which only stain certain cells of interest. Specific stains may in particular be immunohistochemical (IHC) stains, operating on the principle of a binding reaction between an antibody (present in the stain) and an antigen. Such a stain is for example coupled to an enzyme that produces a specific staining.

IHC staining can be direct or indirect. For direct staining, a visual stain (or enzyme) is coupled to an antibody capable of binding directly to the antigen to be stained. The indirect method is carried out in two steps. First, a primary antibody without label (without visual stain) is bound to the targeted antigen; second, after rinsing off the excess, a secondary antibody with visual stain (or enzyme) is added and binds to the primary antibody.

Diaminobenzidine (DAB, brown staining) and hematoxylin-aminoethylcarbazole (H-AEC, blue staining for the nucleus and red-brown for the contour) are known immunohistochemical stains. Observation of images from IHC staining generally gives haloes tinted the hue of the stain on the periphery of the biological cells of interest targeted by the staining, and nuclei tinted the hue of the counterstain (blue if the counterstain is hematoxylin).

In the following example, the histopathological image is stained with diaminobenzidine (DAB hereinbelow) and hematoxylin (alternatively or in addition to hematoxylin, the image may comprise eosin staining).

Preliminarily, a histopathological image of the tumor, comprising an indication of the tumor boundary (said boundary being preferably visible using an annotation of the image made by a practitioner), is required. As such, the process in FIG. 2 optionally comprises a step 100 of determining the tumor boundary B. The boundary B, which delimits the biological object of interest constituted by the tumor (or optionally a set of tumors), is here a closed curve. Alternatively, the boundary B can be an open curve.

Step 100 is carried out either automatically, by automatically reading of the image I stained with a histological stain, or manually by an operator, preferably a health practitioner trained in histopathology.

Alternatively, the histopathological image I received by the processing unit implementing the process may already include an annotation of the tumor boundary B. For example, if the image I is acquired by the processing unit via the Internet from a sharing platform, the image I may have been previously annotated by a practitioner, using image processing software, to reveal the tumor boundary B.

Step 100 identifies the region of interest comprising the biological object to be studied (here a tumor) for the following steps. The annotation 100 of the boundary B advantageously replaces a step of automatic segmentation of the region of interest comprising the tumor.

Figure 3:
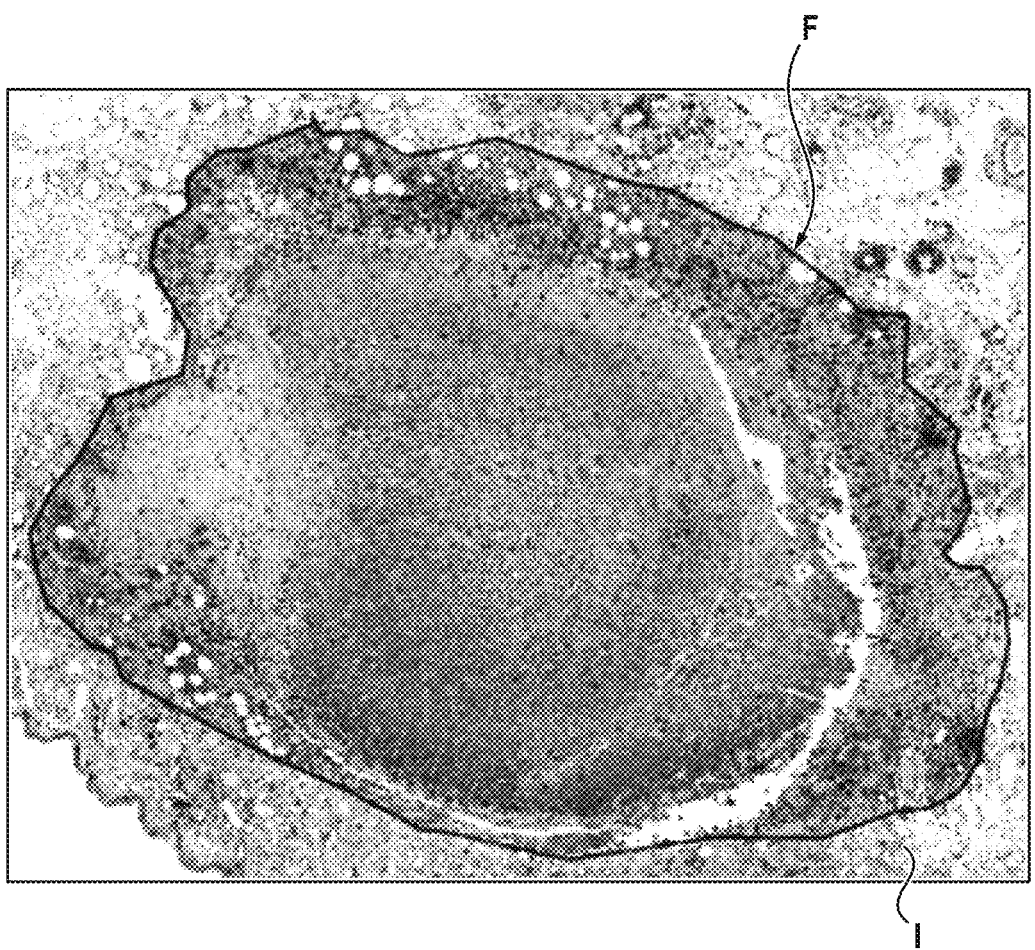
FIG. 3 is a first image from a virtual slide of a biological tissue section containing a tumor.

FIG. 3 shows a histopathological image I from a virtual slide of a tumor, with an annotation of the tumor boundary B. In this example, the biological object to be studied (meaning the tumor), located inside the closed curve F, corresponds to a surface with a lower luminosity compared to the rest of the image. The tumor boundary B is indicated by a broken curve (thick line). The histopathological image I, stored temporarily or permanently by the processing unit 10, is preferably a large image, for example more than 3 gigabytes and a resolution of 150,000×100,000 pixels. The image I is for example a whole-slide image (WSI). In the image I, the tumor delimited by the boundary B has a diameter of about 2 millimeters.

The process for determining the lymphocyte infiltration profile continues with a step 200 of detecting pixels of the image I corresponding to lymphocytes.

It is recalled that the biological tissues comprising the tumor were stained with a histological stain, preferably an immunohistochemical stain specific to lymphocytes, before the acquisition of the image I. Lymphocyte detection exploits the distinct staining of lymphocytes on the image I, compared to the rest of the elements visible on the image.

The histopathological image of the present example comprises DAB as lymphocyte-specific stain and hematoxylin as counterstain. First, a sub-step 210 of separating these two stains on the image is implemented.

A known histological method for stain separation is based on color deconvolution as a function of light absorption by the different stains (Beer-Lambert's law, see Ruifrok, Johnston et al. (2001), Quantification of histochemical staining by color deconvolution, *Analytical and quantitative cytology and histology*, 23(4):291-299). However, immunohistochemistry stains scatter incident light, rather than absorb it, and Beer-Lambert's law is therefore not applicable.

It has been observed that the deconvolution of the pixel colors of the image I in the hue-saturation-lightness (HSL hereinbelow) space effectively discriminates the different, especially immunohistochemical, stains on an image.

Step 210 takes as input a reference hue, saturation and lightness of the desired immunohistochemical stain, allowing a reference point of said stain to be placed in the HSL space in three dimensions. During this step, an intermediate image $I_{int}$ of stain separation is generated, each pixel of the image $I_{int}$ having a grayscale corresponding to the distance between the corresponding pixel of the image I and the reference point in the HSL space. The closer a pixel of the image I is to the reference point in the HSL space, the darker the corresponding pixel of the image $I_{int}$ is.

By way of example, if the reference point has coordinates $(h_0, s_0, l_0)$ in the HSL space, an equation of the distance I (color-space function) of a pixel p of coordinates $(h, s, l)$ in the HSL space from said reference point is as follows:

$$I(p) = 1 - \left[\frac{(1 - d_H(p)) \times (1 - d_S(p)) \times (1 - d_L(p))}{1 - d_S(p) + \varepsilon}\right],$$

with the following values of $d_H(p)$, $d_S(p)$ and $d_L(p)$:

$$d_H(p) = 1 - \exp\left[\frac{\cos(h - h_0) - 1}{\cos(h - h_0) + 1 + \varepsilon}\right],$$
$$d_S(p) = |s - s_0|,$$
$$d_L(p) = |l - l_0|,$$

and a value of the parameter $\varepsilon$ that can be set to 1/255.

Figure 4A:
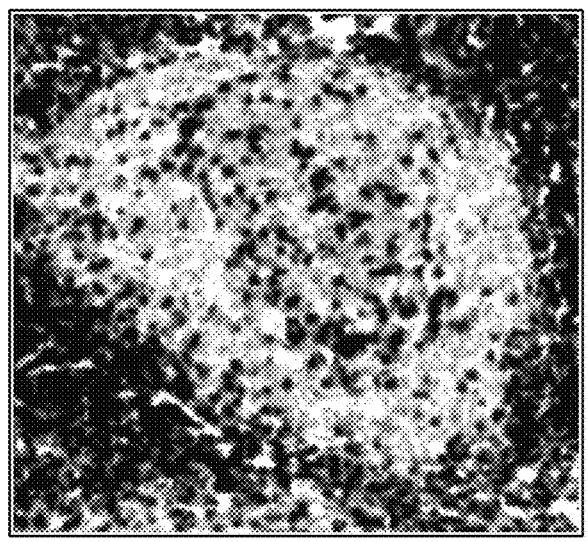
FIG. 4a is a second image from a virtual slide of a biological tissue section containing a tumor, in which lymphocytes have been stained.

By way of illustration, FIG. 4a shows a histopathological image from a virtual slide of a tumor sample other than the one shown in FIG. 3. As in the image in FIG. 3, the tumor in FIG. 4a was stained with DAB and hematoxylin. The tumor boundary is clearly visible and not represented.

Figure 4B:
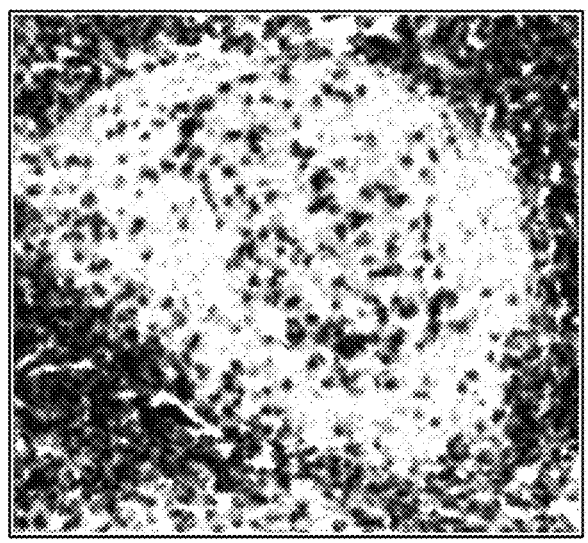

FIG. 4b is an image obtained by separating the stains according to the distance calculation above, considering a reference point associated with DAB. The dark pixels in the image in FIG. 4b thus correspond to lymphocytes on the image before stain separation. This image is of interest for the quantification of lymphocyte infiltration.

Figure 4C:
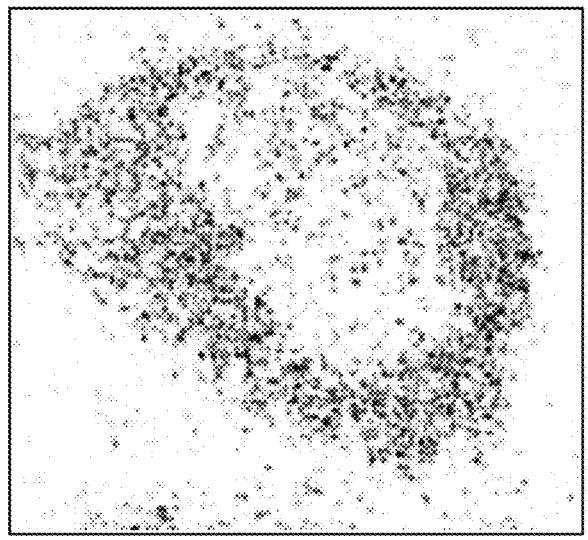

The image in FIG. 4c is obtained by separating the stains using the same method, considering a reference point associated with hematoxylin. The dark pixels in the image in FIG. 4c correspond to DNA.

Figure 5:
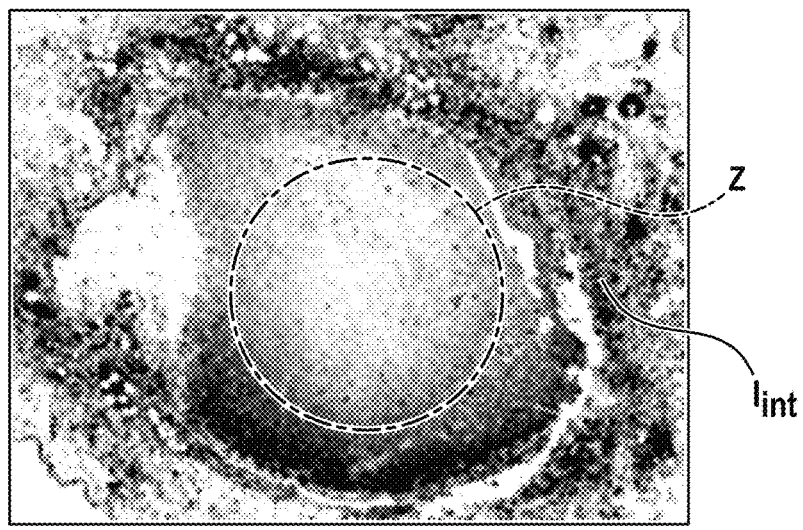
FIG. 5 is a grayscale image resulting from the separation of the immunohistochemical stain in the image in FIG. 3.

FIG. 5 shows the intermediate image $I_{int}$ of stain separation derived from the histopathological image I (without boundary B) in FIG. 3, with stain separation in the HSL space. The image $I_{int}$ used for the rest of the process is obtained with a reference point having a predetermined hue, saturation and lightness corresponding to the DAB stain. FIG. 5 shows an area Z, indicated by a dotted line, corresponding to a bluish area of the histopathological image I, resulting from hematoxylin staining; it is noted that the stain separation image $I_{int}$ does not distinguish this bluish area from other white pixels in the image.

Alternatively, the intermediate image $I_{int}$ can be generated using the distance to a reference point corresponding to the stain in the red-green-blue (RGB) space.

Step 200 of the process then comprises an automated detection of the pixels corresponding to lymphocytes in the image I. In the present example, lymphocyte detection results in a binary image, where the pixels corresponding to lymphocytes are of a predetermined color (in black), and all other pixels are of the background color (in white).

Figure 6:
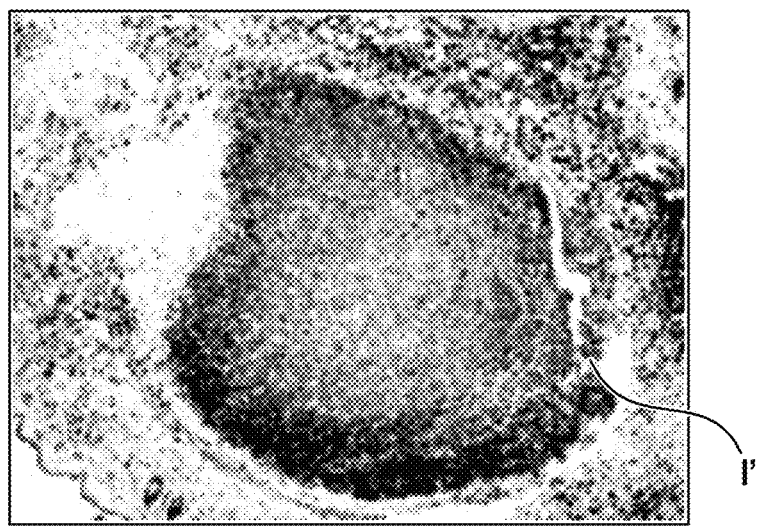
FIG. 6 is an image from the Otsu binarization of the stain-separated image in FIG. 5.

From the image $I_{int}$ of lymphocyte-specific stain separation, the treatment unit first implements a binarization 220, for example a binarization according to the Otsu method. Binarization produces, from the grayscale image $I_{int}$, a threshold image I'. The threshold between the pixel class of the foreground (including the pixels to be detected) and the pixel class of the background is optimized during Otsu binarization to obtain a minimum intra-class variance. FIG. 6 shows the threshold image I' obtained after Otsu binarization from the intermediate image in FIG. 5.

The black pixels in the image in FIG. 6, detected as foreground pixels, include both pixels associated with lymphocytes and pixels associated with fibrosis.

Step 200 according to the present example comprises an additional step 230 of lymphocyte detection, in order in particular to distinguish lymphocytes from fibrosis. One objective is to separate, on the image I, a first class formed of pixels corresponding to the DAB stain, from a second class formed of the other pixels of the image.

To that end, step 230 comprises a K-means classification of pixels between two classes, in other words two clusters, from the intermediate image $I_{int}$ and the threshold image I'. For the application of the K-means algorithm, the centroid of the lymphocyte class is advantageously initialized to at least the gray levels detected in the intermediate image $I_{int}$, and the centroid of the fibrosis class is initialized to a value α. The value α is advantageously obtained using the following equation:

$$\alpha = \frac{\sum_{p \in \mathbb{N}^2} I_{int}(p) \mid I'(p) = 0}{|\{p \in \mathbb{N}^2 \mid I'(p) = 0\}|}$$

where the sum function is carried out on the pixels p of the intermediate image Iint of stain separation, and the image I' obtained by binarization.

Step 230 of lymphocyte detection by K-means classification is advantageous, as it gives results of good accuracy for the detection of objects of interest, in this case lymphocytes. Because the histopathological images studied are two-dimensional images from real (three-dimensional) biological samples, it is generally difficult to distinguish lymphocytes from other cell types in the sample; however, the results obtained by K-means classification are satisfactory.

Figure 7:
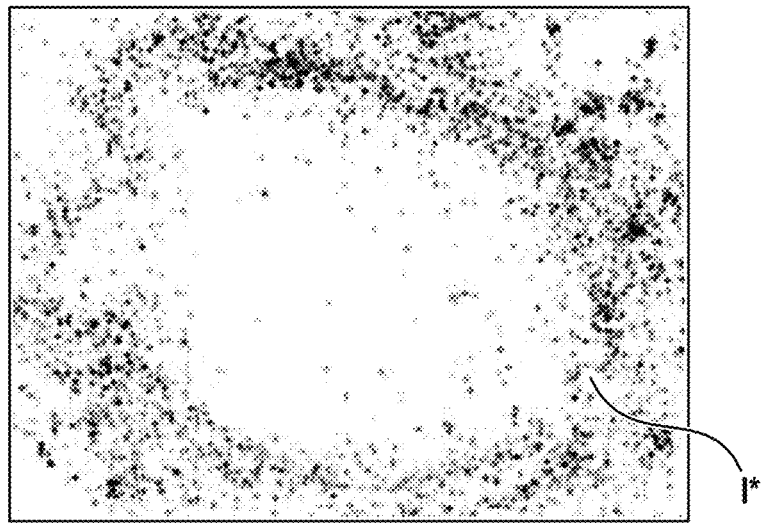
FIG. 7 is a lymphocyte detection image obtained from the image in FIG. 3, where the pixels corresponding to lymphocytes are in black.

FIG. 7 shows the lymphocyte detection image I* derived from the K-means classification applied to the binary image I'. The image I*, which is a binary image, has in black the pixels corresponding to the lymphocytes visible in the image I, and in white the other pixels. The image I* can therefore be used to calculate lymphocyte density.

It should be noted that, alternatively, step 200 of detecting biological cells of interest can be performed before annotation 100 of the tumor boundary B, or in parallel with annotation. It is not necessary to have the position of the boundary B to detect cells highlighted by the histological stain.

The infiltration profile determination process then comprises, in an important way, the determination 300 of a distance map DM.

An advantage of using a distance map from the tumor boundary is that it allows the quantification of lymphocyte infiltration as a function of their distance from the tumor margin.

Advantageously, a detection of an area inside the tumor and an area outside the tumor is implemented, using the Jordan curve theorem. A region of interest (ROI) may have been previously identified in the image I.

Then, from the histopathological image I, the Euclidean distance of each of the pixels of the region of interest from the tumor boundary B, previously annotated or detected, is calculated. The distance of a pixel, with respect to the boundary B, is defined as the minimum of the set formed by the Euclidean distances between said pixel and each of the pixels of the boundary B.

Once said distances have been calculated, successive threshold values of the pixels in the image I are determined as a function of their distance to the boundary B, so as to obtain a set of iso-curves. An iso-curve $DM_d$ of the distance map DM is defined as the curve connecting all pixels located at a distance from the boundary B equal to the value d. A representation of the distance map DM can be obtained by superimposing the iso-curves $DM_d$ on the histopathological image I.

Figure 8:
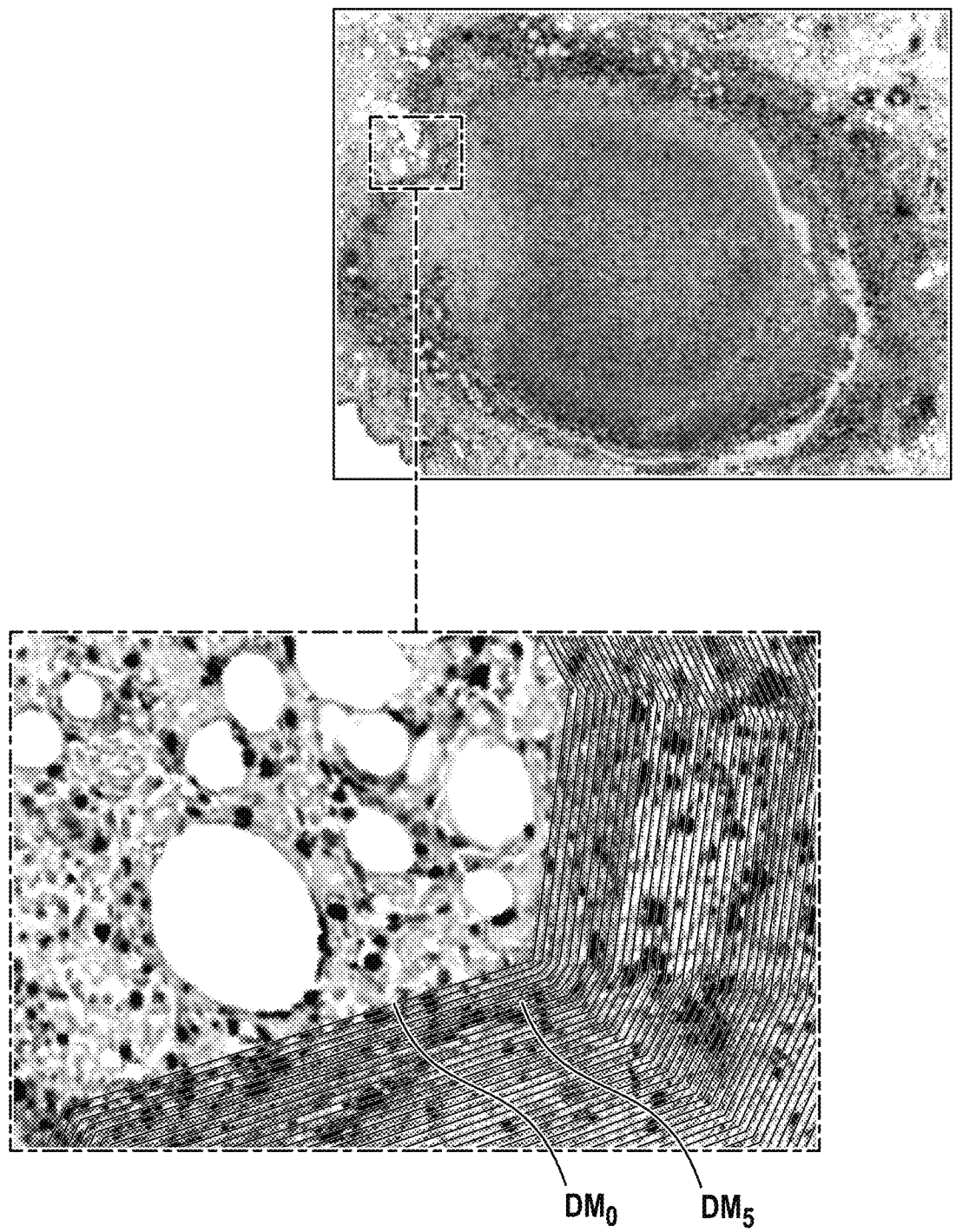
FIG. 8 is an image with the iso-curves of a distance map to the tumor boundary identified in FIG. 7 superimposed on the image of FIG. 5; a close-up view of an area of this image is shown at the bottom of FIG. 8.

FIG. 8 shows the distance map DM obtained at the conclusion of step 300, for the image I in FIG. 3. By convention, pixels outside the boundary B are defined as having a negative distance to the boundary B, and pixels inside the boundary are defined as having a positive distance to the boundary. The iso-curves $DM_d$ corresponding to positive distances are represented. A rectangle of the image I is represented at a larger scale at the bottom of FIG. 8. The iso-curve $DM_0$ corresponds to the pixels adjacent to the boundary B. The iso-curve $DM_5$ was also identified, connecting pixels located at a distance d=5 μm from the boundary B.

In FIG. 8, the distance map is obtained at the scale of the entire tumor. The determination of the distance map does not require the placement of quantification areas around the tumor. It should be noted that step 300 of determining the distance map DM can alternatively be implemented prior to lymphocyte detection in step 200, or in parallel with lymphocyte detection. The calculation of the distance map DM takes as input the histopathological image I.

The distance map DM on the one hand, and the lymphocyte detection image I* on the other, can be used together to group the pixels detected as corresponding to lymphocytes according to their distance from the tumor front. As such, the process in FIG. 2 comprises a step 400 of determining the lymphocyte infiltration profile as a function of lymphocyte distance to the boundary B. Step 400 takes as input the distance map DM, the histopathological image I and the binary lymphocyte detection image I*.

For each distance value d to the boundary B, a density f(d) of lymphocytes per unit area corresponding to said distance is determined in step 400. A number δ of pixels per unit area is predetermined according to the resolution of the image I, as well as an average number θ of pixels per lymphocyte. This is done with an average lymphocyte size, which allows a general lymphocyte infiltration trend to be obtained. For an image resolution of 0.329 micrometers per pixel, for example, the δ value is 46193.2167 pixels per square micrometer and the θ value is 315 pixels per lymphocyte on average. With these predetermined values, the lymphocyte surface density is obtained as follows during a calculation sub-step 420:

$$f(d) = \frac{a*\delta}{(a+b)*\theta}$$

The value a corresponds to the number of pixels detected as stained with DAB, among the pixels at a distance d from the boundary B, while the value b corresponds to the difference between the total number of pixels at the distance d and the number a of pixels stained with DAB. The number (a+b) is therefore the total number of pixels at the distance d from the front F. The value a is obtained in a sub-step 410 during which, for the distance value d, a count is made of the pixels that are both black in the image I* (therefore detected as stained with DAB in the image I) and located between the iso-curve $DM_d$ and the consecutive iso-curve $DM_{d+1}$.

Figure 9:
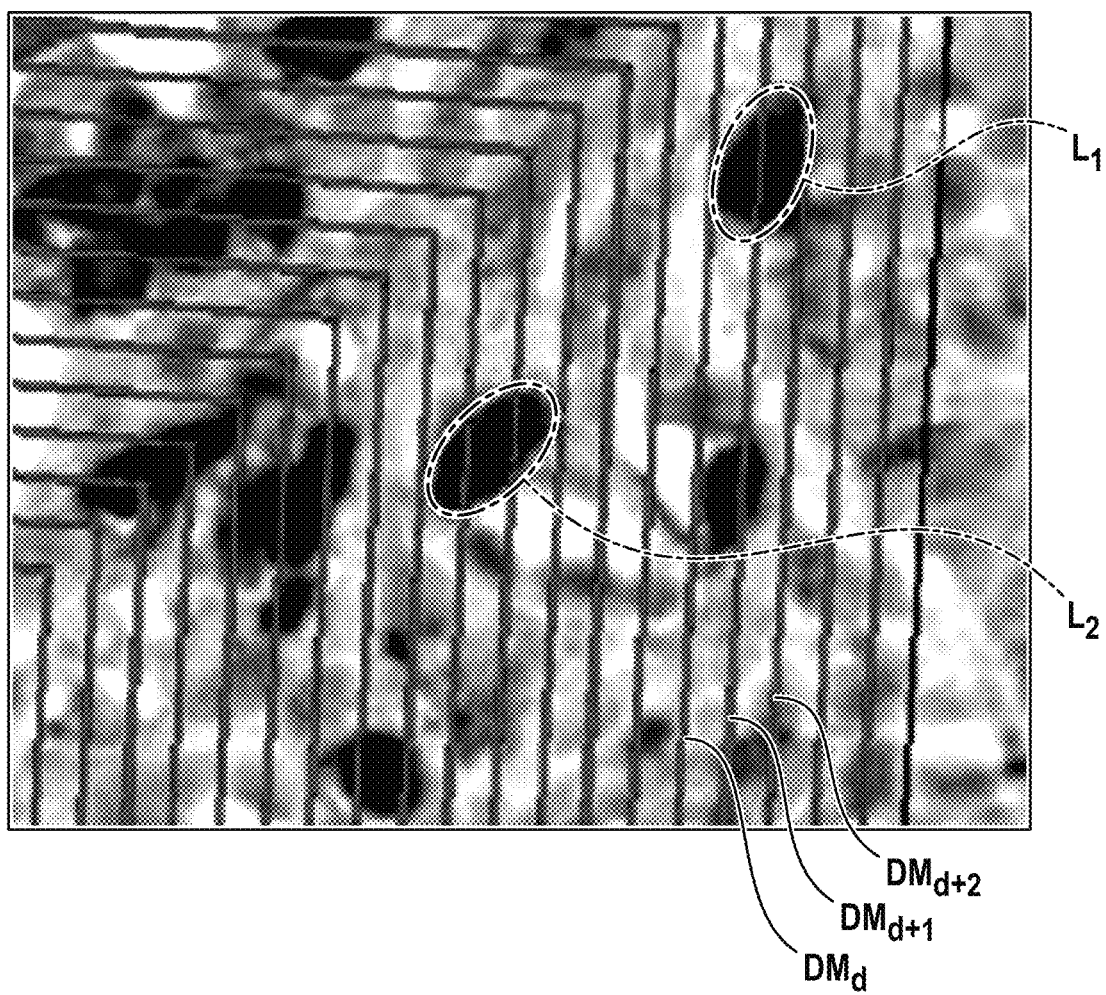
FIG. 9 is a representative diagram of the distribution of a lymphocyte between several tumor boundary distance values.

Note that the count 410 is carried out only according to the black or white color of the pixels in the image I*. The number of lymphocytes crossing the iso-curve $DM_d$ is not taken into account. FIG. 9 shows a superimposed view, at a larger scale than that of FIG. 3, of the image I and iso-curves $DM_d$, on which two lymphocytes $L_1$ and $L_2$ were identified; the pixels corresponding to lymphocytes $L_1$ and $L_2$ are distributed, during step 410, among several distance values, as they overlap iso-curves. For example, lymphocyte $L_1$ extends between iso-curves $DM_d$ and $DM_{d+2}$; about 40% of the pixels corresponding to $L_1$ are counted as being at distance d from the tumor boundary, and about 60% of the pixels corresponding to $L_1$ are counted as being at distance d+1.

The measure of lymphocyte density per unit area is thus obtained at the scale of an entire tumor. This measure is repeatable and reproducible, in particular because it does not depend on a placement of quantification areas; this measure depends mainly on the identification of the boundary B, and on the values of the predetermined parameters for binarization and for counting the pixels corresponding to lymphocytes.

Figure 10:
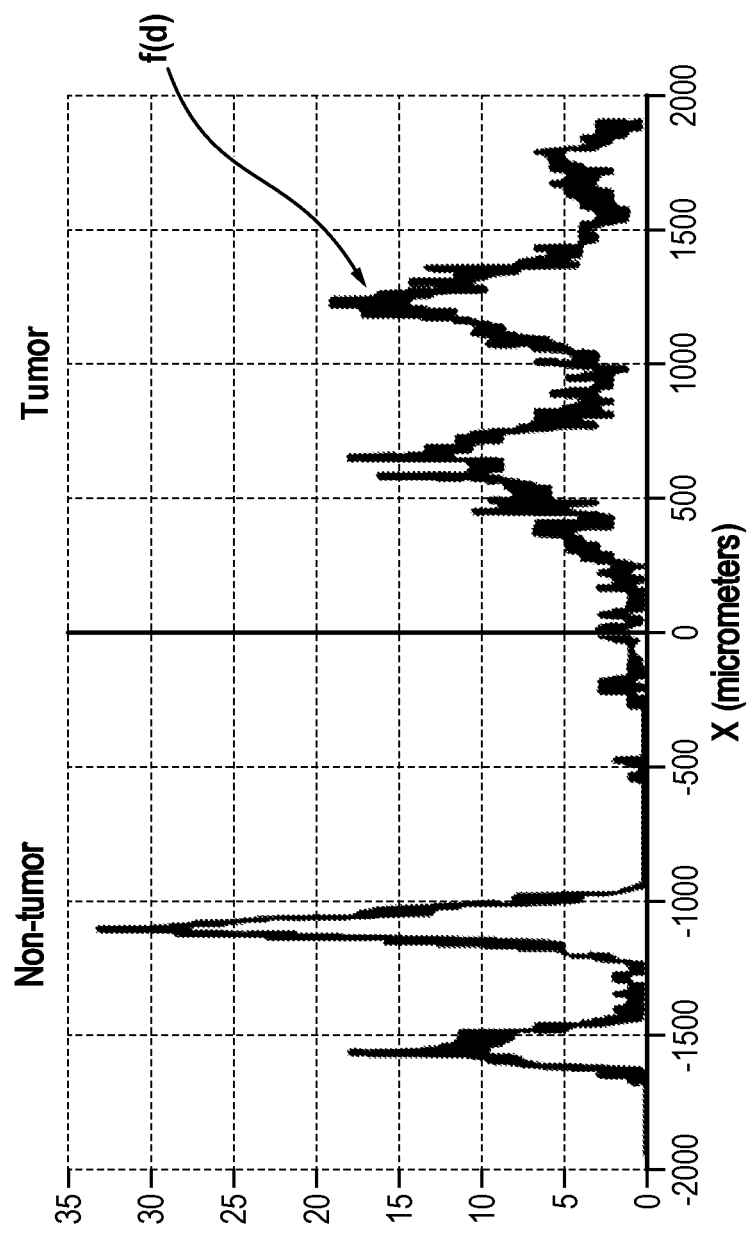
FIG. 10 is an example of a lymphocyte infiltration profile obtained according to the process in FIG. 2.

Optionally, the lymphocyte surface density values obtained at the conclusion of step 400 are represented on a curve as shown in FIG. 10, showing on the abscissa the tumor boundary distance values and on the ordinate the lymphocyte surface density for each of these distances. By convention, negative distances (outside the tumor boundary) are represented on the left and positive distances (inside the tumor boundary) are represented on the right.

The curve thus obtained provides a profile of lymphocyte infiltration inside the tumor visible on the histopathological image I.

Optionally, observation of the infiltration profile by an expert, such as an anatomic pathologist, allows the profile to be classified into a category, among the following four types of lymphocyte infiltration, associated with different clinical outcomes (see Allard et al. (2012), Linear quantification of lymphoid infiltration of the tumor margin: a reproducible method, developed with colorectal cancer tissues, for assessing a highly variable prognostic factor, *Diagnostic Pathology*, 7(1):156, and Emile et al. (2017), Histiocytoses: General classification and molecular criteria, *La Presse Médicale*, 46(1):46-54):

Type 1: No lymphocyte infiltration;
Type 2: Low lymphocyte infiltration of the tumor front;
Type 3: High lymphocyte infiltration of the tumor front only;
Type 4: High lymphocyte infiltration of the tumor front and inside the tumor.

Indeed, a lymphocyte infiltration profile obtained using the process described above makes it possible to distinguish between the case of infiltration of the tumor front only (high lymphocyte surface density only for low boundary distance values), and the case of lymphocyte infiltration to the center of the tumor (lymphocyte surface density also high for distances far away from the boundary).

The invention claimed is:

1. Process for determining an infiltration profile of biological cells of interest in a biological object of interest, from a digital histopathological image of biological tissues, a boundary of the biological object having previously been determined within the histopathological image,
   wherein a histological stain has previously been applied to the biological tissues,
   the process, carried out by a processing unit, comprising generating an image for detecting biological cells comprising pixels of a predetermined color, the pixels of the predetermined color corresponding to areas of the histopathological image stained with the histological stain,
   wherein the process further comprises the following steps:
   determining a distance map comprising iso-curves, each iso-curve comprising all pixels of the region of interest located at a Euclidean distance to the boundary equal to a distance value;
   from the distance map, calculating a curve representative of the surface density (f(d)) of biological cells of interest, the calculation comprising a count, for each distance value, of pixels that are both of the predetermined color on the detection image and located between the iso-curve associated with said distance value and the consecutive iso-curve,
   wherein the pixels located outside the boundary are associated with negative distances in the distance map and the pixels located inside the boundary are associated with positive distances in the distance map, the density curve of biological cells of interest comprising the negative distances on a left part and comprising the positive distances on a right part.

2. Process according to claim 1, wherein during the calculation step, the surface density (f(d)) of biological cells of interest is obtained by the following formula:

$$f(d)=(\alpha*\delta)/(\beta*\theta).$$

wherein α is the number of pixels that are both of the predetermined color on the detection image and located between the iso-curve associated with the distance value d and the consecutive iso-curve, β is the total number of pixels between the iso-curve associated with the distance value and the consecutive iso-curve, θ is a predetermined average number of pixels per biological cell, and δ is a predetermined number of pixels per unit area.

3. Process according to claim 1, wherein the step of generating the biological cell detection image comprises the following sub-steps:

from the histopathological image, separating the histological stain from other stains by image processing giving an intermediate image;

Otsu binarization of the intermediate image, detecting biological cells of interest from the intermediate image and from an image resulting from Otsu binarization, by separating a first class formed of pixels corresponding to the histological stain from a second class formed of the other pixels.

4. Process according to claim 1, wherein the histopathological image comprises, in addition to the histological stain, a non-specific stain, for example hematoxylin or eosin, the step of separating the histological stain comprising a deconvolution of the colors of the histopathological image over the hue/saturation/lightness space.

5. Process according to claim 1, wherein the step of detecting biological cells of interest comprises a K-means classification using a centroid of the class of biological cells of interest and a centroid of the fibrosis class.

6. Process according to claim 1, comprising a preliminary step of determining, manually or automatically, the boundary within the histopathological image.

7. Process according to claim 1, wherein the histopathological image is a virtual slide formed by tiling a plurality of microscopic images of biological tissues.

8. Process according to claim 1, comprising an additional step of graphically representing an infiltration map of cells of interest on which the iso-curves are superimposed on the histopathological image of the region of interest, the color of an area between two consecutive iso-curves being variable according to the surface density value (f(d)) of biological cells of interest.

9. Process according to claim 1, comprising additional steps of determining an area under the area under the area density curve (f(d)) of biological cells of interest as a function of the distance to the boundary, for a given distance interval, and comparing the area obtained with a predetermined threshold value.

10. Process according to claim 1, wherein the biological object of interest is a tumor or a set of tumors, and the boundary is a tumor boundary.

11. Process according to claim 1, wherein the histopathological image, on which the boundary has previously been determined, is downloaded by the processing unit from a remote database, preferably via a network connection.

12. Process according to claim 1, wherein the biological cells of interest are T cells, or B cells, or NK cells.

13. Process according to claim 5, wherein the centroid of the class of biological cells of interest is taken equal to the minimum gray level of the intermediate image, and wherein the equation for the centroid of the fibrosis class is as follows:

$$\alpha = \frac{\sum_{p \in \mathbb{N}^2} I(p) \mid I'(p) = 0}{|\{p \in \mathbb{N}^2 \mid I'(p) = 0\}|},$$

14. Processing unit comprising:

a memory configured to record a histopathological image, a first subunit configured to determine a distance map comprising iso-curves, each iso-curve being associated with a distance value and comprising all pixels of the histopathological image located at a Euclidean distance from a boundary equal to said distance value, wherein the pixels located outside the boundary are associated with negative distances in the distance map and the pixels located inside the boundary are associated with positive distances in the distance map, a second subunit configured to calculate a curve representative of the surface density of biological cells of interest in the histopathological image as a function of distance from the boundary, the processing unit being configured to implement the infiltration profile determination process of claim 1.

15. Non-transitory computer-readable storage medium storing code instructions which, when executed by a processing unit, allow the implementation of the process for determining an infiltration profile according to claim 1.

* * * * *